Sept. 29, 1942.     J. BAILEY     2,297,645
PROCESS OF AND APPARATUS FOR EXTRUDING PLASTIC SHEETS
Filed Dec. 22, 1941     7 Sheets-Sheet 1

Sept. 29, 1942.                J. BAILEY                    2,297,645
              PROCESS OF AND APPARATUS FOR EXTRUDING PLASTIC SHEETS
                   Filed Dec. 22, 1941           7 Sheets-Sheet 5

Sept. 29, 1942. J. BAILEY 2,297,645
PROCESS OF AND APPARATUS FOR EXTRUDING PLASTIC SHEETS
Filed Dec. 22, 1941 7 Sheets-Sheet 6

Inventor
James Bailey
by Brown & Parham
Attorneys

Patented Sept. 29, 1942

2,297,645

UNITED STATES PATENT OFFICE 2,297,645

PROCESS OF AND APPARATUS FOR EXTRUDING PLASTIC SHEETS

James Bailey, West Hartford, Conn., assignor to Plax Corporation, Hartford, Conn., a corporation of Delaware Application December 22, 1941, Serial No. 423,912

11 Claims. (Cl. 18—12)

This application is a continuation in part of my copending application Serial No. 274,490, filed May 19, 1939. The present application discloses improved embodiments of the process and apparatus of the earlier application.

The invention relates to the production of continuous organic plastic sheet or ribbon by extrusion and the general object is to provide a novel process and novel apparatus for that purpose which are efficient and practicable.

Various kinds of organic plastic compounds may be formed into sheet in accordance with the invention. An example of the type of plastic compound with which the invention is concerned is a cellulose ester (not including cellulose nitrate) such as cellulose acetate.

The invention has been developed primarily for use in "dry process" extrusion. The term "dry process" means that the plastic compound which is extruded is "solvent-free" or "free of solvents" of the volatile type such as acetone or alcohol. Therefore, a principal purpose of this invention is to provide a novel process and novel apparatus for forming plastic sheet by dry process extrusion.

Prior to this invention continuous sheet of organic plastic has been produced largely by solvent casting and solvent extrusion, both of which processes are objectionable because of the expense and difficulty of solvent removal or "curing." This is eliminated by the dry process.

Although it has been proposed prior to this invention to form sheet and other shapes by dry process extrusion, the unusual difficulties which arise in dry process extrusion and the limitations of such prior proposals have severely restricted the use of the dry process; where used, the sheet produced usually has been of poor quality, suitable only for remolding as in making laminated windshield glass, or the sheet has been made from relatively soft plastic compounds of limited application. Such poor quality has been due to such defects as high degree of strain, poor colloid structure, blush or cloudiness. Where high quality sheet has been wanted, it has been necessary to use either solvent casting or especially conducted solvent extrusion (extrusion of solvent pastes or gels), each requiring curing to remove the solvent. To illustrate the limitations of prior dry process extrusion, good quality sheet of cellulose acetate compound has not, to my knowledge, been produced by dry process prior to my invention.

Another object of the invention is to produce organic plastic sheet of good quality by dry process extrusion, particularly from relatively hard compounds. By good quality, I mean a quality approaching, if not equaling, that of cast sheet produced by carefully conducted solvent casting of the same or similar compound.

Such cast sheet is notable for its "good structure," that is, continuous colloid structure; high strength which is substantially uniform in all directions as manifested by freedom from directional brittleness; good transparency or clarity due to absence of fine cracks or tears which appear as blush or cloudiness which, in other methods, usually result from rolling or stretching the sheet when it is too viscous; relatively little and well distributed strain; and freedom from other defects such as bubbles and unevenness in gauge. It is very difficult to avoid such defects in sheet formed by extrusion, especially when comparatively hard organic plastic compounds are used having relatively high softening temperatures. Sheet made of such hard compounds finds many uses in fabricating articles or forming them by heating and shaping, for which soft plastic compounds are not suitable because they are too limp. When used in heating and shaping, the sheet should be relatively strain-free, otherwise it will "unmold" and spoil the articles being made.

In general, the above and other objects are accomplished according to this invention by thoroughly heating and working the solvent free thermoplastic compound to lower its viscosity to within a certain working range of viscosity, homogenizing the plastic at such low viscosity and extruding it through a nozzle at low viscosity. The preferred viscosity range for the plastic as measured where it leaves the nozzle is approximately $5 \times 10^5$ to $2 \times 10^6$ poises according to the Wiley method* for determining viscosities of organic

---

*The viscosity in poises wherever recited herein is ascertained from the Wiley method as described in "Industrial and Engineering Chemistry," November 1941, page 1377, in which the coefficient of viscous traction of test specimens is measured under controlled conditions of temperatures and application of stress and the viscosity calculated from data so obtained according to the equation $$\eta = mgl^2/SA_oL_oD$$

where $\eta$=viscosity in poises, $m$=effective load in grms., $g$=988 cm./sec./rec./, $L_o$=limited length of specimen in cms., $l$=length of specimen when rate of elongation is determined, in cms., $A_o$=initial cross-sectional area in sq. cm., $D$=rate of elongation when length is $l$, in cm./sec.

plastics.

In this range, the plastic is not self-supporting but will slump, usually badly, if not prevented from doing so.

Preferably the sheet is prevented from slumping by moving it at a rate greater than the deformation rate and by gradually increasing its viscosity so that the sheet eventually is hardened. The special steps which I prefer to use to prevent slumping comprise chilling the edges only of the sheet to make them self-supporting and gripping these chilled edges to carry the low viscosity sheet longitudinally and stretch it transversely while, at the same time, longitudinal tension is applied across the entire width of the sheet. The chilled edges permit the sheet to be held without tearing or distortion, which otherwise would occur because of the low viscosity of the plastic. The sheet preferably is held out of contact with solids except on its chilled edges and on the hardened part thereof to prevent mars.

The rate of increase in viscosity of the plastic preferably is controlled, at least in the initial stages and while the sheet is being stretched transversely in order to produce sheet of the desired quality. Also, the initially formed portion of the sheet is so low in viscosity that it must be protected from drafts and from jets and blasts of air or gas which would deform or injure the sheet if allowed to impinge thereon. A novel construction is provided by the invention for the above purposes.

For a more complete understanding of the novel process and apparatus of the invention, reference should be had to the following specification and the accompanying drawings disclosing one embodiment of the apparatus which is adapted to the performance of the process of the invention.

In said drawings:

Fig. 7a is a view in vertical section taken approximately on the line 7a—7a of Fig. 6 and looking in the direction of the arrows;

The process is first described with brief reference to principal parts of the apparatus. Following this, a detailed description of the apparatus is set forth.

The solvent-free plastic molding compound preferably is heated to soften it to a desired working viscosity and pressure applied thereto for the purpose of extruding it, by feeding the compound from a feeder F into a heated screw stuffer S. The stuffer S is heat jacketed so that it may be heated by a suitable fluid heating medium. The molding compound usually, though not necessarily, is in dry granular or powdered condition when placed in feeder F.

Figure 1:
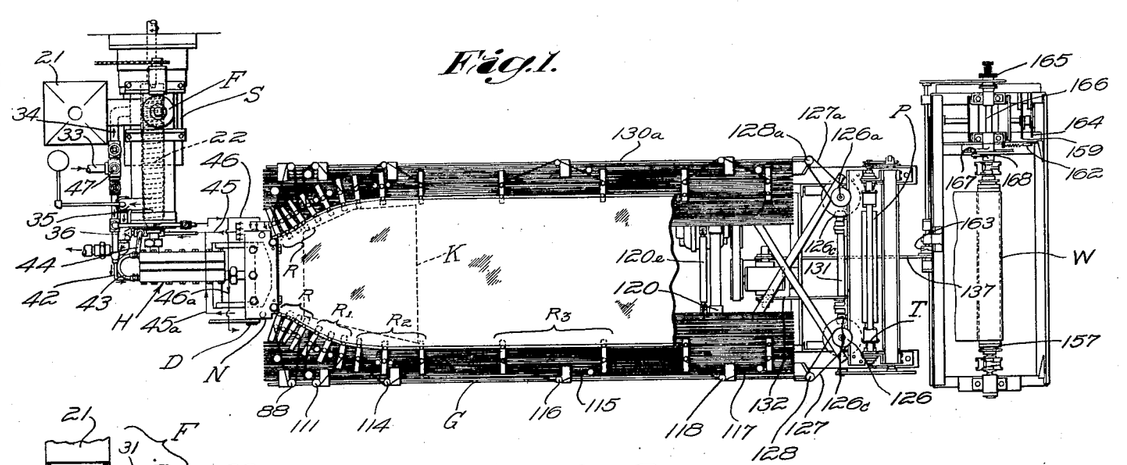
Figure 1 is a partially diagrammatic view in top plan of substantially the entire apparatus for forming continuous plastic sheet by extrusion and showing a large portion of a sheet in the process of formation.
Figure 2:
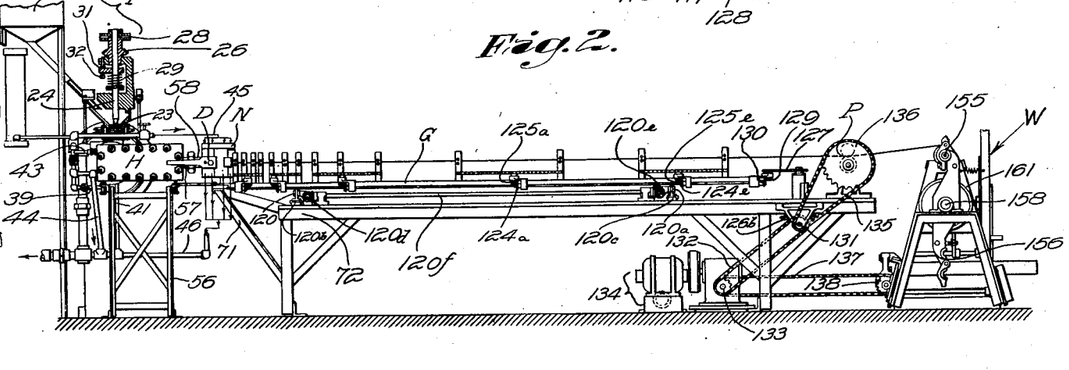
Fig. 2 is a view in side elevation of the apparatus shown in Fig. 1.
Figure 4:
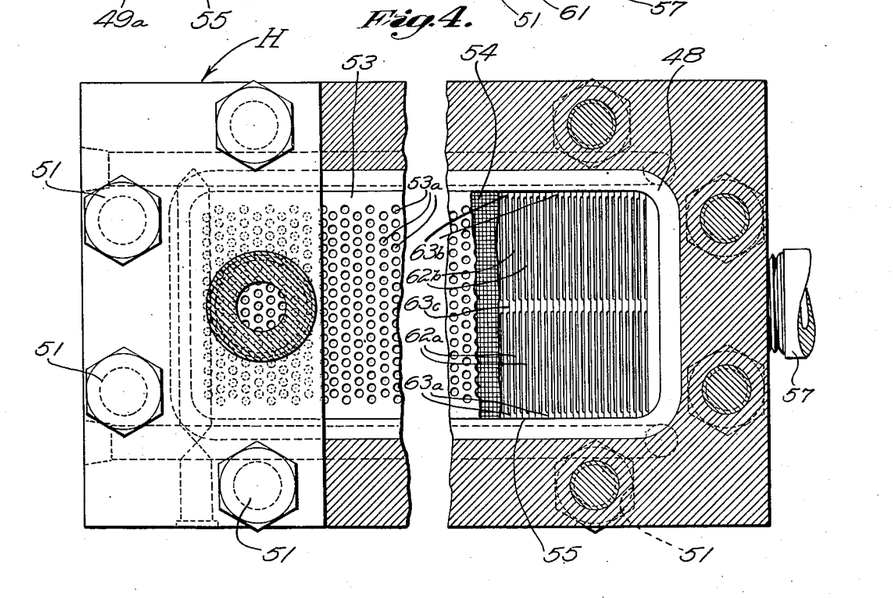
Fig. 4 is a further enlarged view in vertical section of the homogenizer shown in Fig. 3 and taken substantially on the line 4—4 of Fig. 3.
Figures 5, 6, 7:
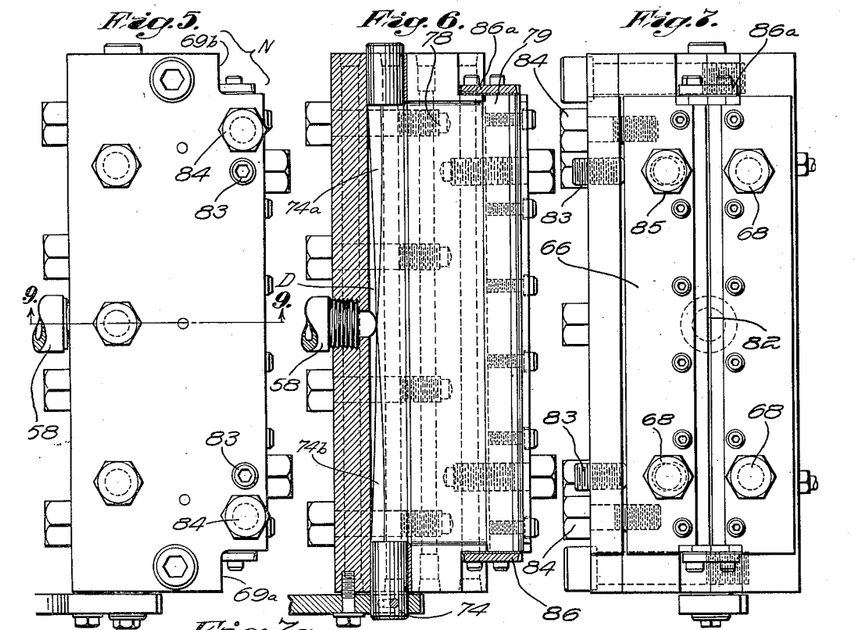
Fig. 5 is a view on enlarged scale in top plan of an extrusion nozzle in the apparatus of Figs. 1 and 2.
Fig. 6 is a view in horizontal section of the nozzle construction of Fig. 5, taken approximately on the line 6—6 of Fig. 9.
Fig 7 is a view in front elevation of the construction of Fig. 5.
Figures 6A, 8, 9:
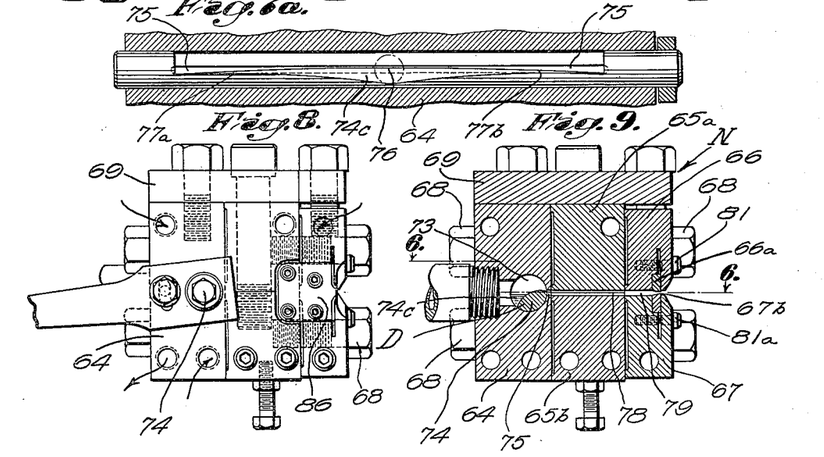
Fig. 8 is a view in side elevation of the said nozzle construction.
Fig. 9 is a central vertical sectional view of the said construction taken approximately on the line 9—9 of Fig. 5.

The screw stuffer S serves to compress and work the molding compound and to soften it by heat of friction, as well as applied heat, and then to deliver it to a homogenizer, shown at H, Figs. 1, 2 and 4. Homogenizer H contains a very fine porous medium, such as wire cloth, the maximum fineness of which is of the order of 700 meshes per linear inch, and the principal purpose of which is to make uniform the viscosity of the plastic compound, which it does by holding back particles too large to pass through the very fine medium or cloth while permitting highly heated material to pass therethrough. In this sense the homogenizer differs from a filter, the function of which is merely to prevent particles of certain minimum size from ever passing through it, although it will be understood that homogenizer H also acts as a filter to retain foreign matter which may be in the plastic compound.

The homogenizer H also is heat jacketed for the control of its temperature and of the plastic compound therein, to further heat the compound and assist in the homogenizing thereof.

From the homogenizer H, the plastic compound flows into an extrusion nozzle N, Figs. 1, 2 and 5 to 9, which is provided with a narrow slot through which the plastic compound is extruded in sheet or ribbon form. To control the gage of the sheet, that is, to form a sheet of uniform thickness while utilizing a slot of uniform height across its entire width, the transverse distribution of the plastic delivered to the slot of the nozzle is controlled so as to compensate for the greater frictional resistance to the flow of plastic material which exists at the ends of the slot than exists in the central part thereof. A device for this purpose, preferably operable during the operation of the machine and contained in the nozzle construction N, is indicated at D in Figs. 1, 2, 6 and 9.

As the plastic extrudes in sheet form, it is engaged on narrow edge portions only, by various pairs of rolls, the rolls of each pair engaging opposite sides of the sheet. One or more initially opposed pairs of rolls are chilling and pressing rolls which serve to chill or chill-press and to substantially stiffen the edge portions of the sheet gripped thereby, while at the same time drawing the plastic from the nozzle and stretching the sheet transversely. Thus, duplicate groups of water cooled, chill-pressing rolls are indicated at R, Fig. 1, at opposite sides of the sheet. At R1 are indicated opposed duplicate groups of rolls, which together with groups R serve to apply a transverse stretching action to the sheet in a region closely adjacent to the nozzle N and to apply longitudinal tension thereto. Beyond the rolls R and R1 are additional opposed groups of rolls R2 and R3 which likewise serve to support the sheet and to apply a longitudinal tension thereto, while near the end of the apparatus there is a pair of puller rolls of puller P which extend across the entire width of the sheet, preferably at or beyond a point in the travel of the sheet where it has hardened sufficiently to prevent marring its surface. The puller P applies tension across the entire width of the sheet.

As explained in detail hereinafter, the rolls of groups R, R1, R2 and R3 are adjustably mounted on a grill G so that their positions may be changed to vary the amount and rate of stretch applied to the sheet and to form sheets of varying widths. Further, there may be located preferably beneath the sheet and approximately coincident with the zone in which the stretching is effected, a suitable heater K to apply heat to the sheet as it is being stretched to control its viscosity. Further illustration of such heater is found in Figs. 16 to 19 inclusive.

Where it is desired to trim off the edge portions of the sheet, a rotary trimmer, such as indicated at T, may be provided, this trimmer comprising pairs of rotary knives located at each side of the sheet. Also when it is desired to wind up the sheet in a roll, a suitable winding device, as shown at W, may be employed.

In carrying out my invention, I prefer to employ molding compounds which have been fully colloided. In the case of cellulose ester compounds, those colloided with volatile solvent are preferred to those otherwise colloided. Also cellulose ester compounds must be "de-volatilized" to remove adventitious moisture and solvent supposed to have been, but not fully or sufficiently, removed in making the compounds. Therefore, such compounds as furnished to the trade for molding cannot be employed when of the cellulose ester type, unless de-volatilized, as described below.

A suitable "de-volatilizing" treatment for cellulose ester compounds comprises passing the compound through a rotary dryer against a countercurrent of dry air entering at 240° to 250° F. and the compound moving through the dryer at such a rate that the moisture content is reduced to about .02%. When so treated, the compound may be extruded and shaped at a viscosity of from $.5 \times 10^5$ to $2 \times 10^6$ poises and at atmospheric pressure and formed into a sheet without bubbles appearing. It should be explained, however, that it is very difficult to determine the percentage of such minute an amount of moisture as .02% or higher and therefore the extent of drying is most accurately defined by saying that it is carried to the point where bubbles will not form under the conditions specified. Moisture content stated above was determined by the known method of measurement of toluene adherence and absorption.

In treating the cellulose compounds to reduce the moisture content to or below such critical limit, enough of the other bubble-forming adventitious volatiles which may be present, such as volatile solvent used in colloidizing the compound and air, also are expelled to prevent bubbles from forming during extrusion.

It will be understood from the foregoing that the temperatures of the stuffer S, homogenizer H and nozzle N are so controlled that the plastic issues from the nozzle N at the desired viscosity, the preferred viscosity range being $.5 \times 10^5$ to $2 \times 10^6$ poises. These limits are determined by the fact that at a substantially lower viscosity than $.5 \times 10^5$ poises, the plastic lacks sufficient strength for handling while if the viscosity exceeds $2 \times 10^6$, the plastic is apt to be strained during or after extrusion or stretching at the desired rate prevented. A preferred viscosity within the preferred range is $.5 \times 10^6$ poises.

Preferably, the effective temperatures of the stuffer S and homogenizer H are kept higher than those of nozzle N so that the plastic will be at least as low, and preferably lower, in viscosity in the homogenizer H than in nozzle N to facilitate the homogenizing of the plastic. It is preferred to maintain the highest temperature in the stuffer S at the feeding end to assist in expelling air and other volatiles such as moisture and solvent. However, the plastic may be lowered in viscosity, rather than increased in viscosity, during its passage through nozzle N. Preferably the temperature of nozzle N is regulated independently of other parts of the apparatus and this also is true of homogenizer H. This permits greater flexibility in operation and better control over the viscosity of the extruding plastic.

Between the nozzle N and the point where the sheet has been stretched to its maximum width and beyond, the plastic is increased in viscosity by reducing its temperature. The longitudinal viscosity gradient in the transverse stretching zone preferably is kept in a low range to prevent the introduction of strain. If the viscosity of the sheet is allowed to increase too rapidly it may become badly strained and cloudiness or blush may appear.

If the viscosity of the sheet tends to increase too rapidly or is too high in the transverse stretching zone, the sheet is carefully heated. This heating may only retard the natural cooling of the sheet by radiation although the heating may, in some cases, definitely raise the temperature and lower the viscosity of the sheet. Preferably, the viscosity is held below that at which blushing might occur. A preferred maximum viscosity is about $1 \times 10^{10}$ poises where the maximum width of the sheet is attained.

The heating of the sheet may be carried beyond the transverse stretching zone and may be varied both transversely and longitudinally of the sheet. Thus, instead of applying the same amount of heat longitudinally of the sheet, the amount of heat applied may be varied so that the desired longitudinal temperature gradient may be maintained in the sheet, particularly in the transverse stretching zone. The heating may be varied transversely to equalize the stretching or to locally increase the stretching relative to other longitudinal portions of the sheet. For example, parallel longitudinal temperature zones may be maintained at different temperatures respectively.

In the preferred operation, the viscosity of the plastic near nozzle N is so low that it must be protected from drafts, jets of gas or air blasts. This may be done by using baffles or forms of protection which should be arranged at least to prevent direct impingement of air or gases on the sheet and preferably so as to prevent any forceful contact of air or gas on the sheet in the region of low viscosity.

Also, the low viscosity of the plastic requires protection of it from vibration because vibration tends to cause formation of bands or waves in the sheet as it issues from the nozzle. Therefore, it has been found necessary to rigidly mount the apparatus and to construct the moving parts to operate with very little vibration.

It is difficult to give significant temperatures for the stuffer S, homogenizer H and nozzle N because of the fact that these parts of the apparatus are made of heavy castings having relatively large areas from which the heat radiates at a high rate. Consequently, the surface temperatures of the various parts of the apparatus are much lower than the temperatures inside the apparatus at surfaces in contact with the plastic and lower than the temperature of the plastic itself. For example, a much lower temperature reading is obtained from the surface of the nozzle N than is obtained at the bottom of a thermometer well in the nozzle.

The following table sets forth a suitable range of temperature and preferred temperatures at various points in the apparatus shown in the drawings when producing sheet from pre-colloided cellulose acetate compound containing 72.5% cellulose acetate and 27.5% plasticizer comprising 60% dimethyl phthalate and 40% diethyl phthalate.

Table of temperatures of apparatus in degrees F.

|  | Range | Preferred |
|---|---|---|
| Recorder* | 360–450 | 420 |
| Stuffer S—Discharge end surface | 301–374 | 346 |
| Homogenizer H—Entrance end—Bottom of Therm. well | 358–430 | 358 |
| Nozzle N—Surface | 308–344 | 333 |
| Nozzle N—Well bottom | 344–411 | 383 |
| Nozzle N—Outside of lip | 344–423 | 395 |
| Sheet at nozzle lip | 346–429 | 370 |
| Sheet at 5th roll | 293–331 | 331 |
| Sheet at first point of maximum width | 261–292 | 261 |
| Rolled edge of sheet at 5th roll | 122–144 | 136 |
| Viscosity of extruding sheet—poises | $.6 \times 10^5$ to $1.2 \times 10^6$ | $.65 \times 10^6$ |

*Recorder—Temperature of oil entering stuffer S, homogenizer H, and nozzle N.

It will be understood that the above temperatures will be varied according to the working viscosity of the organic plastic compound being operated upon in order to maintain the desired or preferred viscosities throughout the plastic.

The above compound has a viscosity of $1 \times 10^6$ poises (which is within the working range) at about 350° F.

Considering now the details of the apparatus and referring particularly to Figs. 1 and 2, there will be seen at 21 a hopper of feeder F which receives molding powder or compound for delivery into the stuffer S containing a screw indicated at 22 for compressing the compound and forcing it through the apparatus. In order to obtain a uniform flow of plastic through the apparatus, the feeder F is provided with a screw 23 operating in the inlet to the stuffer chamber and serving to feed the compound into the stuffer.

The screw 23 is mounted on a vertical shaft 24 which is driven from a shaft 25 through bevel gears, one of which is shown at 26, the bevel gear 26 having a driving connection with shaft 24 through a clutch 28. The clutch is held engaged by a compression spring 29 to drive the screw 23 so long as an excessive amount of molding compound has not been fed to or is not being fed to the stuffer. If an excessive amount of compound is so fed to the stuffer, back pressure of the plastic exerts an axial thrust on the bottom of screw 23 forcing it upwardly against the pressure of spring 29 and disengaging the clutch 28 to stop the rotation of the screw 23 and thus to discontinue the feeding of the molding compound.

The rate of feed may be regulated by adjusting the pressure on the spring 29 by means of a collar 31 surrounding shaft 24 and engaging the upper end of the spring 29. The collar 31 is adjusted by means of screws 32.

It will be understood that suitable driving mechanism (not shown) is provided for driving the screw 23 and the stuffer S. Such mechanism is of known construction and illustration and description thereof are unnecessary for an understanding of the present invention and therefore have been omitted.

The stuffer S is provided with suitable heat jacketing (not shown) so that the compound introduced into the stuffer may be heated to high temperature. The stuffer may be heated by means of oil from a suitable source supplied through a pipe 33 which enters the plastic receiving end of the stuffer chamber through a pipe 34 for the delivery of the hot oil into the heating jacket. The oil leaves the heating jacket near the discharge end of the stuffer through an outlet pipe indicated at 35 which connects to a return pipe 36.

Figure 3:
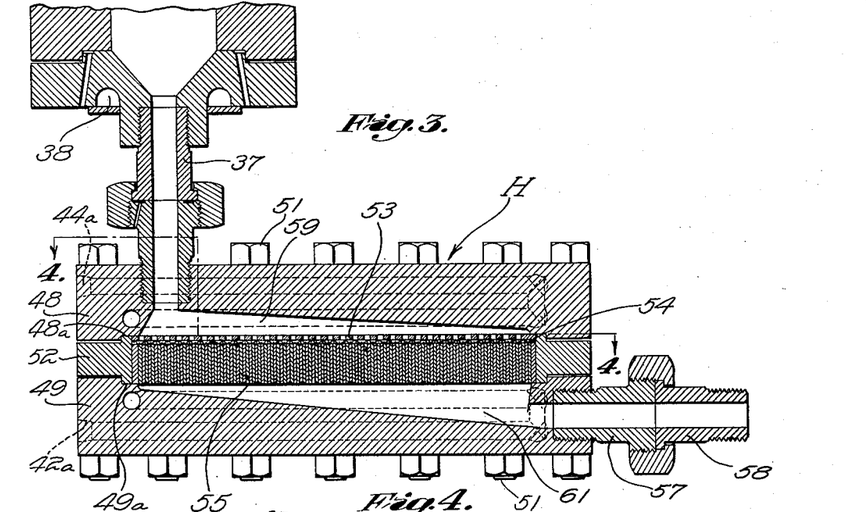
Fig. 3 is an enlarged view in central horizontal section of a homogenizer included in the apparatus of Figs. 1 and 2.

The interior of the stuffer S communicates with the interior of the homogenizer H through a pipe 37, as shown in Figs. 1 and 3. At the discharge end of the stuffer chamber and surrounding the outlet of the stuffer is a circular passage 38, Fig. 3, which receives hot oil from an inlet pipe 39, Fig. 2, to heat the plastic flowing from the stuffer into the pipe connection 37. From the oil passage 38 the oil returns to the source through a return pipe 41 which connects into the return pipe 36.

Branch oil supply pipes lead from the oil inlet pipe 33 to the homogenizer H and nozzle N from which branch return pipes lead into the main return pipe 36. Thus oil inlet pipe 42 leads into the bottom of one side of the homogenizer H, out of the top of that side and through a loop 43 into the top of the other side of the homogenizer from the bottom of which the oil returns through a pipe 44 connecting into the return pipe 36.

Similarly, oil inlet pipe 45 conveys oil to one end of the return nozzle N, the pipe 45 having four branch connections with the nozzle as indicated diagrammatically in Fig. 1. There is likewise a return pipe 46 having four connections with nozzle N indicated diagrammatically. These connections are duplicated at the opposite side of the nozzle to which oil is led through a branch supply pipe 45a and flows back to the source through return pipe 46a. The oil inlets in the illustrated construction (not all of which are shown) connect in at the top of one side and the bottom of the other side and oil outlets at the bottom of the first side and the top of the second side. The upper inlets and lower outlets at one side only are shown diagrammatically in Figs. 1 and 2.

The temperature of the oil in the supply line 33 and its branches may be indicated by means of a recording pyrometer, the thermocouple of which may be inserted at 47 where the supply line 33 branches through a T connection as shown. The temperature readings obtained in this way are referred to above in Example I as "recorder" temperatures. Valves in the branch lines control the flow to and hence the temperature of the stuffer S. homogenizer H and nozzle N.

Considering now the homogenizer H and referring to Figs. 1, 2, 3 and 4, it will be seen that the homogenizer comprises heavy plates 48 and 49 held together by bolts 51 and between which is clamped a retainer ring 52 within which are mounted a perforated plate 53, screening 54 and a large number of backing plates 55.

The homogenizer is supported on a stand 56 in vertical position so that the plastic entering through pipe 37 flows in at one side of the homogenizer near one end thereof (rear looking at Fig. 2) and out of the other side at the opposite end through pipe connection 57 coupled to pipe 58 connected to the nozzle N.

The plate 53, screening 54 and backing plates 55 extend vertically through the homogenizer. The inlet chamber 59 of the homogenizer decreases in width toward the discharge end while the outlet chamber 61 increases in width toward the discharge end. This tends to facilitate a substantially uniform flow of plastic material through the homogenizer throughout its length and over the entire area of the screening.

The plate 53 serves as a retainer and protector for the screening, the holes 53a therein distributing the plastic uniformly over the screening. The holes 53a are arranged in vertical rows which line up with channels between backing plates 55 which channels are described below. The screening preferably is woven wire such as that having 700 meshes per linear inch in one direction and 150 meshes per linear inch in the other direction. This screening is preferably backed by a coarser screening, such as 350×75 or 100 mesh woven wire cloth.

The high pressure applied to the plastic by the stuffer, which is necessary to overcome the resistance to flow through the nozzle and other passages, exerts a very high unit pressure on the screening which tends to burst it. To prevent this the backing plates 55 are provided which support the screening on their edges. The maximum area of support for the screening consistent with the required total area of flow passage is obtained by forming two shallow channels 62a and 62b on one side only of each of the plates. These channels are so formed as to provide ribs 63a and 63b and a center rib 63c on each plate. Thus, when the plates are stacked together, as shown in Figs. 3 and 4, with the ribs of each against the flat side of the next plate, the plastic flows through these channels into the outlet chamber 61. The channels preferably are cut to a depth of about .010 of an inch. This very narrow depth prevents injury to the screening.

Coring for the circulation of hot oil through the homogenizer H is indicated in dotted lines, Figs. 3 and 4, the hot oil entering at 42a in the block 49 and leaving the homogenizer at 44a of the block 48.

The retainer ring 52, plate 53, the screening 54 and the backing plates 55 are held in position by marginal clamping edge portions formed on the interior of the plates or blocks 48 and 49, as indicated at 48a and 49a.

The details of construction of the nozzle N will now be described with particular reference to Figs. 5 to 9 inclusive.

The nozzle N comprises a rear block 64, upper and lower middle blocks 65a and 65b and two front blocks or plates 66 and 67, all held together by horizontal bolts 68. There also is a top plate 69 bolted to the blocks 64, 65 and 66. The nozzle construction is mounted on a rearwardly projecting bracket 71 of the frame 72 of the table or grill G.

In the rearmost block or plate 64 is a plastic inlet chamber 73 which contains a rotary plug 74 cooperating with a horizontal slot 75 to regulate and control the transverse distribution of plastic flowing through the nozzle N. Preferably the rotary plug 74 is so shaped as to restrict the flow of plastic in the central portion of the stream and to increase the flow of plastic at the side portions of the stream to distribute the plastic laterally from pipe 58 towards the ends of chamber 73 and to compensate for greater resistance to flow at the sides of the nozzle passages. Thus, as shown in Fig. 7a, the rotary plug 74 is higher near its center portion at 76 and obstructs somewhat the passage of plastic through the slot 75 at that point whereas near the end portions at 77a and 77b, the slot 75 is not so obstructed so that a freer flow of plastic at the sides is made possible.

To assist in the distribution of plastic from the center of the plastic receiving chamber 73 where the plastic initially enters toward the ends of the chamber, the rotary plug 74 is streamlined over areas of compound curvature at 74a and 74b toward each end. Also to obtain a smooth flow of the plastic into the chamber 73 and to eliminate obstruction to such flow, opposite the pipe 58, the plug 74 is cut away and curved or streamlined to diminishing degree in opposite directions, as shown at 74c, on its rear central portion.

The slot 75 in the rear block or plate 64 of the nozzle registers with a long, flat, narrow passage 78 formed between and within the ends of the two center blocks 74a and 74b. This passage 78 in turn registers with a passage 79 formed between the two front blocks or plates 66 and 67 terminating in the upper and lower lips 66a and 67b, consisting of hardened steel inserts retained in slots formed in the respective members 66 and 67 by means of screws 81 and 81a. These hardened steel inserts are highly polished on their exposed ends to form a good finish on the sheet and are readily removed for replacement or for repolishing, as may be required from time to time in the operation of the apparatus.

The extrusion slot formed at 82 between the lips 66a and 67b may be varied in height by adjusting the vertical position of the upper plate 66. The plate 66 is retained in its adjusted position by being drawn upwardly against the threaded studs 83 by means of bolts 84 in the top plate 69 and by tightening the horizontal bolts 68 which pass through slotted holes in plate 66. When it is desired to adjust the plate 66, said bolts 68 and 84 are loosened and the studs 83 adjusted in the desired direction after which bolts 84 and 68 are tightened.

To prevent leakage at the ends of the passage 79 and slot 82, end plates 86 and 86a are provided which cover the ends of the passage and slot and the joint between them. Each of these end members is screwed to the center block portions 65a and 65b and also to the front plates 66 and 67, suitable provision (slotted screw holes, not shown) being made for movement of the member 66 relative to each of these end plates to permit the adjustment thereof, as described above. By reference to Fig. 5, it will be seen that the corners of the nozzle construction are cut away at 69a and 69b. This permits the nearest rolls of group R to be placed quite close to the nozzle N or provides access thereto.

The details of the construction and operation of the rolls which support and convey the sheet extruded through the nozzle N will now be described. The construction and arrangement at one side of the table G is substantially identical with that at the other side, (excepting only that the rolls face in approximately opposite directions) and therefore the description of typical rolls and driving means therefor at one side of the table will suffice for all.

Figure 10:
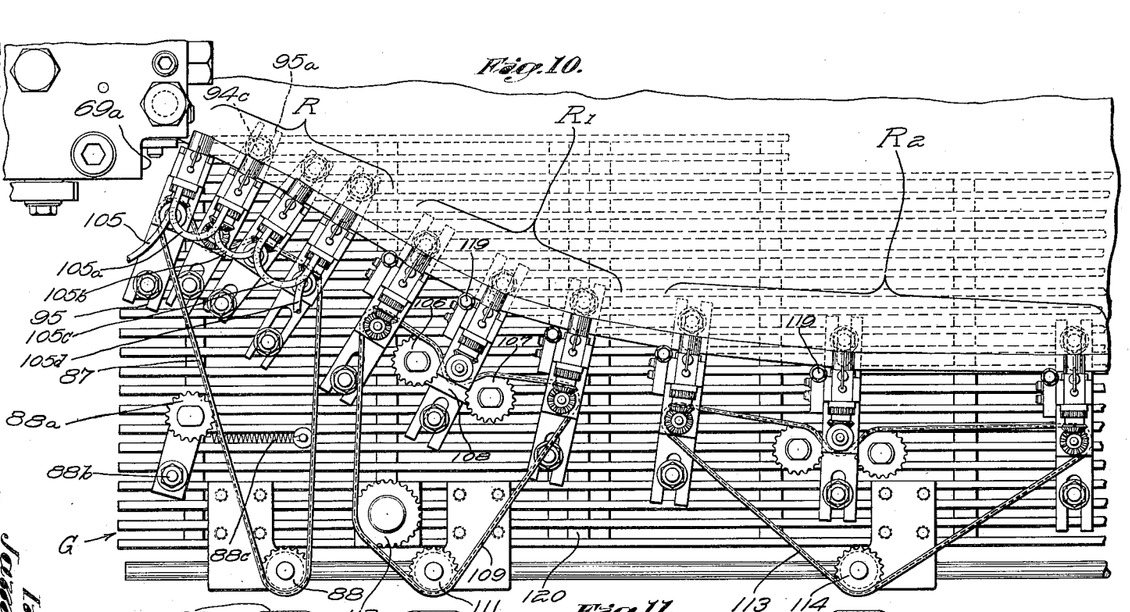
Fig. 10 is a view on enlarged scale of a side end portion of the apparatus shown in Fig. 1, showing a part of the nozzle, adjacent rolls which engage one edge of the sheet being formed and supporting and driving means for the rolls.

Considering first the initial chill pressing and gripping rolls, it will be seen from Fig. 10 that four such rolls are included in group R, all of these rolls being driven by a chain 87 which in turn is driven from sprocket 88. The number of rolls in any group may be varied.

The rolls of group R are substantially identical in construction and description of one will be sufficient. This description has reference to Figs. 12 and 13 as well as Fig. 10. Each roll unit comprises upper and lower rolls 91 and 92 journaled in a bracket 93. The bracket 93 comprises a bottom plate 94 which rests on the grill G and is adjustably secured thereto by a bolt 94a passing upwardly between adjacent rods of the grill G through a slot 95 (Fig. 10) in the outer end of the plate. In the form of bracket shown in Fig. 12, another bolt 94b extends upwardly between another pair of rods of the grill into the plate. Instead of using a bolt 94b, the inner end of plate 94 may be slotted as shown at 95a, Figs. 10 and 13, to receive the clamping bolt 94c.

Rolls 91 and 92 of the roll unit in group R are driven from a sprocket wheel 96 on the lower end of a shaft 97 journaled in bracket 93, the upper end of which shaft carries a bevel gear 98 meshing with another bevel gear 98a on the outer end of the shaft 92a of the roll 92. This shaft carries a spur gear 99 meshing with a similar gear 99a on the outer end of the shaft 90a of the roll 91. The upper roll 91 is not journaled directly in the bracket 93 itself but in a block 101 slidably mounted in the bracket and pressed downwardly, to effect yielding engagement of the roll 91 with the edge portion of the plastic sheet, by means of a compression spring 102 engaging the upper end of the block 101. The spring 102 can be adjusted by means of a thumb screw 103 threaded in the top of the bracket 93.

The headed pin 104 is screw threaded into the upper end of block 101 and by placing a suitable tool under the head of the pin the block 101 and roll 91 may be raised against the pressure of spring 102 for a purpose to be hereinafter explained.

In order to cool the rolls 91 and 92 so that they may serve to chill-press or roll the edge of the plastic sheet, a cooling fluid, such as water, is circulated through the block 101 by means of inlet or outlet pipes 101a and 101b and through the lower part of the bracket 93 through inlet or outlet pipes 93a and 93b respectively. This cooling serves to abstract heat at a high rate from the upper and lower rolls 91 and 92 respectively and in the illustrated construction it will be seen that the first four rolls are provided with connections for cooling, these connections being shown at 105, 105a, 105b, 105c and 105d.

The sprocket chain 87 is passed around and brought into engagement with the sprockets 96 of the various roll units in the group R to drive the rolls. A suitable take-up sprocket 88a may be adjustably secured to the grill G by means of a bolt 88b and yieldingly held against the chain by a tension spring 88c. When the positions of the rolls are changed the take-up sprocket 88a may be shifted to accommodate the chain 87 to the changed positions of the rolls.

It will be seen that the rolls are relatively small in diameter. This permits placing the first opposed set of rolls very close to nozzle N, giving better control over the plastic where it is extruded.

Figures 12, 14, 14A:
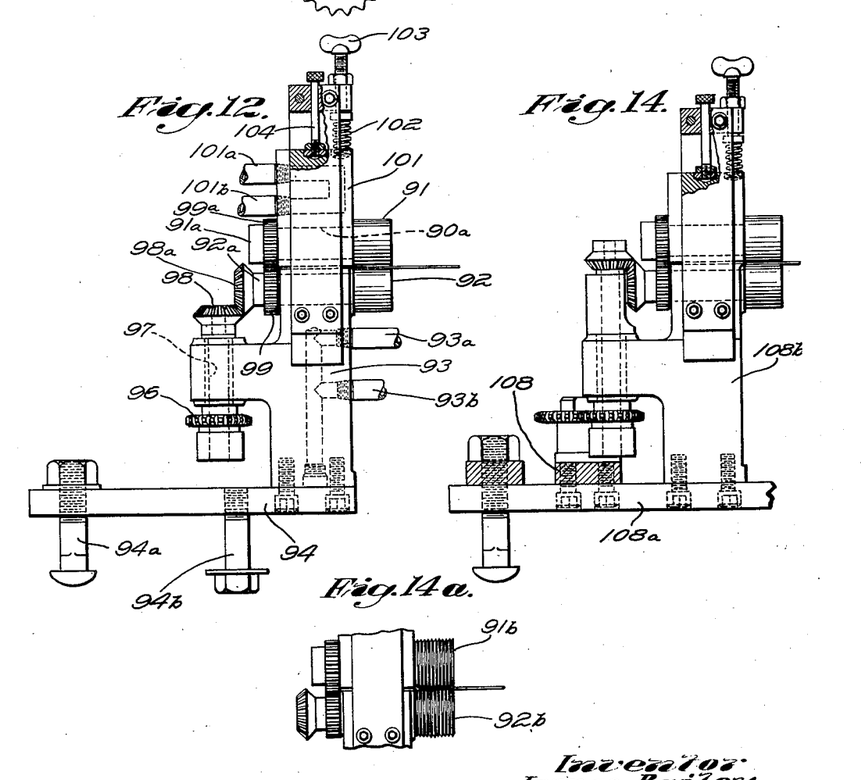
Fig. 12 is a view on further enlarged scale illustrating one form of roll unit, several of which are illustrated in Figs. 1 and 10.
Fig. 14 is a view similar to Fig. 12 showing a similar form of roll unit, several of which are illustrated in Figs. 1 and 10.
Fig. 14a is a view in side elevation of a modified form of roll which may be used in either of the types of roll units shown in Figs. 12 and 14.
Figure 13:
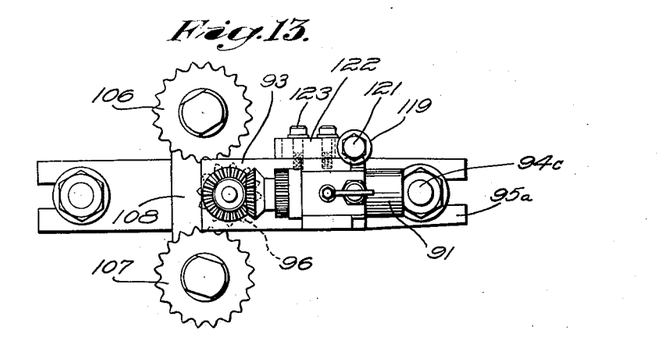
Fig. 13 is a view in top plan of the roll unit shown in Fig. 14.
Figure 15:
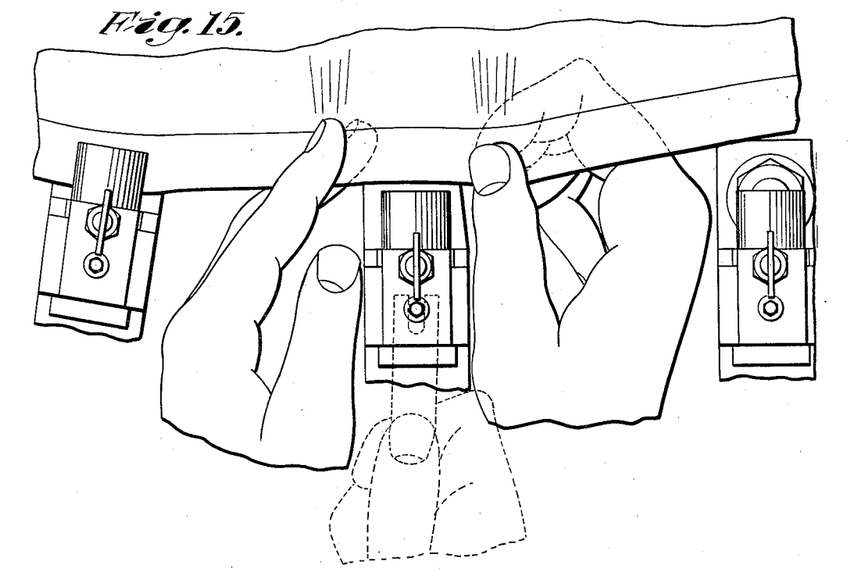
Fig. 15 is a view in top plan on further enlarged scale illustrating the manner in which the edge of a plastic sheet may be placed between the rolls of the roll units for engagement thereby.

In the second group R1 of roll units shown in Fig. 10, in which these units are shown, the units are substantially the same as those of the first group but are not provided with cooling connections although one or more of these rolls also may be cooled if desired. In this group the center roll unit may include sprockets 106 and 107 mounted on a plate 108 on the plate 108a carrying the bracket 108b of the unit, all as shown in Figs. 13 and 14. These are idle sprockets engaged by chain 109 driven from sprocket wheel 111 and passing around and engaging the sprockets of the various roll units as well as the idle sprockets, all as shown in Fig. 10. The drive for this group of rolls also may include an additional takeup sprocket 112 secured to the grill G as shown.

A third group of rolls R2 may be located fairly closely to the group R1, as shown in Figs. 1, 2 and 10. The roll units of this group may be the same as those of group R1 and may be driven in substantially the same way except that the arrangement shown is such as to make unnecessary the use of a take-up sprocket. The rolls of the group R2 are driven by a chain 113 by means of the driving sprocket 114.

Additional groups of rolls R3 and R4, as shown in Figs. 1 and 2, may be arranged near the middle and the end of the table G. The rolls of group R3 are driven by a chain and sprocket 116 and those of the group R4 by a chain 117 and sprocket 118.

From the foregoing description it will be understood that the rolls in any one group may be varied in number and the spacing between the rolls in any one group and between the various groups of rolls may be adjusted for best results in the forming and handling of the plastic sheet.

Each roll unit may be provided with a roller 119, Figs. 10 and 13, mounted on a stud 121 in a block 122 adjustably secured to the side of the bracket 93 by means of bolts 123. The rollers 119 act as guides for the edge of the sheet, as is apparent from Fig. 10 and tend to prevent the sheet from being drawn too far through the rolls 90 and 91, as might occur if the rollers 119 were not engaged by the chilled edge of the sheet.

In lieu of using the smooth rolls 91 and 92, grooved rolls 91b and 92b may be employed. Such grooved rolls form a corrugated edge portion on the sheet, as shown in 14a, to provide a better grip by the rolls on the sheet. It will be understood that only one of the rolls, that is either the upper or lower, may be grooved, as shown in Fig. 14a, although if either the upper or lower roll of any of the groups is grooved the rolls of additional groups preferably are similarly grooved.

Figure 11:
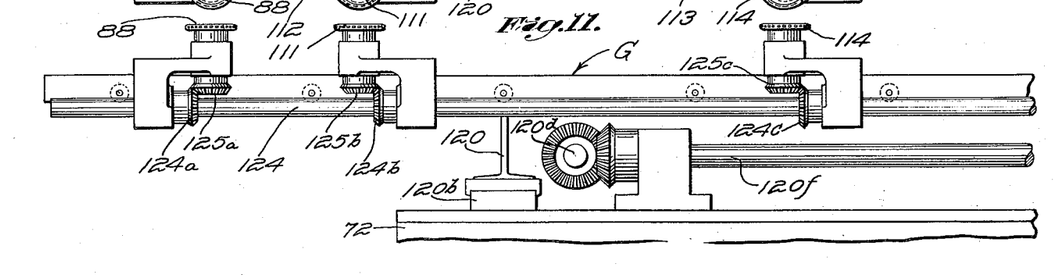
Fig. 11 is a view in side elevation of part of the roll driving mechanism shown in Fig. 10.

In addition to the provision for the adjustment of the roll units individually, the opposite groups of roll units may be simultaneously adjusted toward or away from each other to handle sheets of different widths by corresponding movement of the opposite sides of grill G. As shown in Figs. 1, 2 and 11, each part of grill G is mounted on slides 120, 120a, on guides 120b, 120c extending across frame 72. By rotating screw threaded shafts 120d and 120e, interconnected through shaft 120f, and with which slides 120, 120a have screw-threaded connections, the two sides of the grill G may be moved toward or away from each other.

The various sprockets 88, 111, 114, 116 and 118 are driven from a common drive shaft 124 on which are mounted bevel gears 124a, 124b, 124c, 124d and 124e which mesh with bevel gears 125a, 125b, 125c, 125d and 125e on the respective sprocket shafts. The shaft 124 is, in turn, driven by a sprocket 126 and chain 127 engaging sprocket 128, the shaft of which carries a bevel gear 129 meshing with a bevel gear 130 on the end of the shaft 124. A shaft 130a similar to the shaft 124 on the opposite side of the table is likewise driven by a sprocket 126a, chain 127a and sprocket 128a. The sprockets 126 and 126a are mounted on vertical shafts the lower ends of which carry bevel gears 126b in mesh with bevel gears 126c, on the ends of the transverse drive shaft 131. The shaft 131 in turn is driven by a chain 132 on sprocket 133 of the power unit 134.

The shaft 131 also drives chain 135 on sprocket 136 connected to the lower of the puller rolls P, the upper of which is spring-pressed against the plastic sheet and driven by friction. The trimmer T also may be driven from shaft 131.

The drive unit 134 also may serve to drive a chain 137 engaging sprocket 138 of the reel W.

Figure 16:
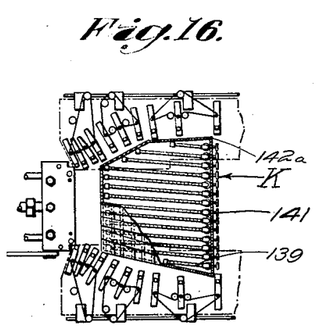
Fig. 16 is a view on reduced scale showing the extruding end portion of the apparatus of Fig. 1 and illustrating a heater below the sheet.
Figure 16A:
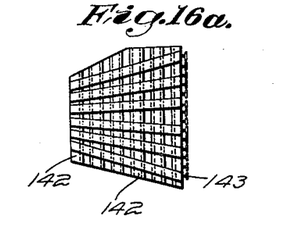
Fig. 16a is a view in top plan of a heat diffusing grill structure associated with the heater of Fig. 16.
Figure 16B:
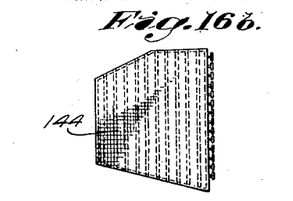
Fig. 16b is a modified form of heat diffusing member for the heater of Fig. 16.

As hereinabove explained, it may be desirable under certain conditions of operation to apply heat to the sheet in or beyond the transfer stretching zone adjacent the extrusion nozzle. In Fig. 16 there are shown a number of gas burners 139 constituting part of a heater (K) for this purpose. The burners are relatively long and extend approximately longitudinally of the path of the sheet and beneath the sheet to apply heat upwardly thereto. Each burner is provided with a control valve 141 so that its flame may be regulated. It may be desirable to heat the sheet more at one side or in one longitudinal zone than at or in another and the separately controllable valves for the various burners make this possible, or to apply uniform heating and to uniformly vary the application of heat across the entire width of the sheet. This may also be done by manipulating the control valves for the burners.

Preferably provision is made whereby unduly localized heating of the sheet may be prevented and also whereby direct impingement of the gas flames or of hot air on the soft and easily deformable sheet may be prevented. In the form of construction shown in Figs. 16 and 17, the burners may be set at an angle to the longitudinal movement of the sheet so that a given point on the sheet passing over the front end of one burner will also pass over the rear end of the next adjacent burner and so on across the row of burners looking from the bottom to the top of Fig. 16. This tends to apply the heat more uniformly to the sheet than would be the case were the burners arranged along exact longitudinal lines because in that case all of the flame from a given burner would be directed against a single narrow zone or line on the sheet and tend to heat it too much in longitudinal zones or lines.

Figure 17:
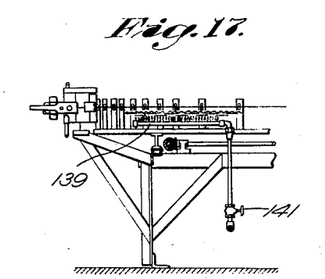
Fig. 17 is a view in side sectional elevation of the construction shown in Fig. 16.

Also the form of heating means in Figs. 16 and 17 preferably is provided with some form of heat-diffusing means. This may take the form of transverse strips of metal 142 alternately arranged above and below each other with their edges in overlapping but slightly spaced relation and across which are placed additional strips of metal 143 arranged in spaced relation but converging toward the extrusion nozzle N. Such strips are supported at their ends by a frame 142a. In lieu of the metal strips 143 there may be employed one or more layers of screening, as indicated at 144, in the modified form of heater shown in Fig. 16b.

Figure 18:
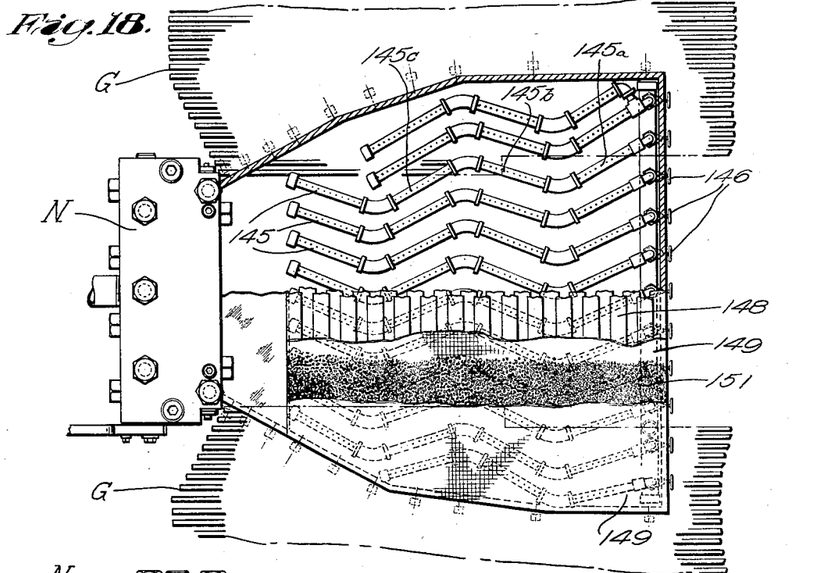
Fig. 18 is a view on enlarged scale of another form of heater and heat diffusing means therefor, parts being broken away to show various layers of material and parts of the construction.
Figures 19, 19A:
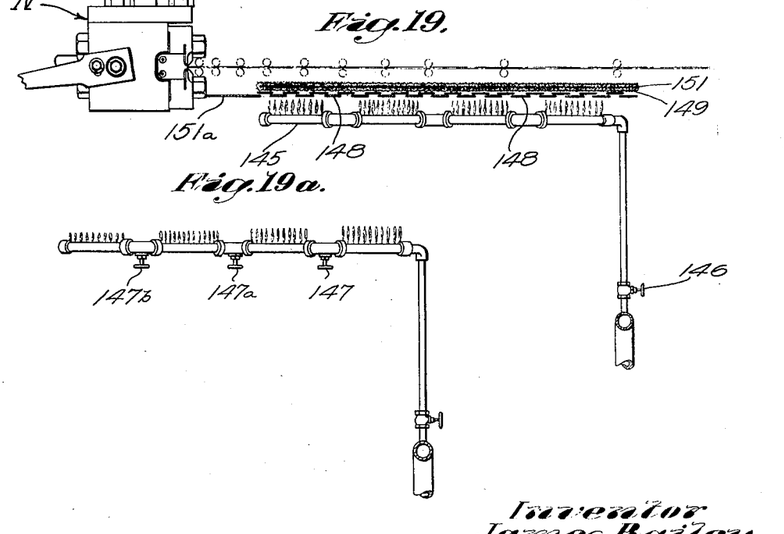
Fig. 19 is a view in vertical sectional elevation of the construction shown in Fig. 18.
Fig. 19a is a similar view of a modified form of burner for the heater of Figs. 18 and 19.

A still further modified form of heater construction is shown in Figs. 18, 19 and 19a. In this construction there are provided a number of burners 145 arranged in much the same manner as burners 139 but differing therefrom in that each of the burners 145 comprises a number of sections 145a, 145b, 145c, etc., connected together as a single burner or pipe but connected in a zig-zag line, as is clearly shown in Fig. 18. As is the case in the form of heater shown in Figs. 16 and 17, the burners in Fig. 18 are arranged transversely in a plane well below the sheet and each burner is provided with a separate control valve 146 and similarly each burner may be provided with control valves 147, 147a and 147b, to control the flame in zones lengthwise of the burner, that is, to control the flame in each of the sections 145a, 145b, 145c, etc., as illustrated in Fig. 19a.

Because of the fact that the sheet diverges or is stretched as it leaves the nozzle to a point substantially distant from the nozzle, the burners in Figs. 16, 17, or Figs. 18 and 19, are arranged to direct heat over a corresponding area, the effect being to provide a heater which is narrower at the nozzle end than at the other end. Thus the burners at or near the sides of the heater may be made shorter than the other burners, as by providing three sections instead of four.

The zig-zag shape of the burners tends to apply the heat more evenly to the sheet than the burner in Figs. 16 and 17 because a given point on the sheet will cross the flames of each burner several times as it moves over the heater.

Also the form of heater in Figs. 18 and 19 provides a more efficient heat-diffusing construction because of the provision over overlapping transverse metal strips 148 of a substantial layer of screening 149 and a substantial layer of pulverulent ceramic or other heat-resisting granular material 151 enclosed within the screening. This has been found to be a very effective heat-diffusing arrangement and affords excellent control of the application of heat to the sheet. It will be understood that there are small spaces between the strips 148, as in Fig. 16, which permit the heat to circulate upwardly through the screening and granular material so that it eventually reaches the sheet, the flow being highly restricted so that the heat is applied very gently to the sheet.

As shown in Fig. 19, a baffle 151 protects the sheet from drafts where it leaves the nozzle. Beyond the baffle, the sheet is protected as far in its travel as necessary by the heater construction already described.

The winder W may be of suitable known construction, that which is illustrated being similar to the winding devices shown in either of the United States Patents Nos. 423,448 granted March 18, 1890, 1,120,520 granted December 8, 1914, and 1,506,437, granted August 26, 1924.

The winder W is provided with supports 155 and 156 for spools upon which the sheet may be wound, one of which spools is shown in operative position at 157. The supports for the spools comprise arms which extend in diametrically opposite directions from a horizontal pivot 158 which permits the winder to be revolved in order to move one spool out of active position for unloading and to move another spool into active position to wind up additional sheet.

The supports are held in vertical position by a lock, not shown, which is operated through connections to a lever 159 by means of which the lock may be released when it is desired to revolve the winder. The turning of the winder is controlled by means of a brake 161 operated through connections to a lever 162. The active spool is driven from sprocket 138 previously referred to through a jaw clutch 163 controlled through connections to clutch lever 164. Clutch 163 has a driving connection with a friction clutch 165 which in turn drives a shaft 166 on which is mounted a crank 167 carrying a pin for engaging a similar crank 168 which drives the spool 157 to perform the winding operation.

In some cases the winder W may be dispensed with, as where the sheet is cut into strips as it leaves the pulling rolls P.

The operation of the apparatus will be understood from the foregoing description of the process and of the details of construction of the apparatus itself.

Various changes may be made in the details of the process and apparatus without departing from the scope of the claims. While the invention relates to the extrusion of cellulose ester compounds, particularly cellulose acetate, it is not limited thereto except where expressly recited in the claims, but may be employed in extruding such cellulose ester compounds as cellulose acetobutyrate, cellulose aceto-propionate, and cellulose triacetate and also ethyl cellulose and various other types of organic plastic compounds.

I claim:

1. The process of shaping organic solvent-free thermoplastic compound which comprises softening said compound by heating it, forcing the compound at high temperature through a nozzle to form a flat ribbon, chill-pressing the edges only of said ribbon close to said nozzle, and supporting the remaining hot plastic portion of said ribbon out of contact with solids until it has hardened by gripping the chilled edges thereof, and by engaging and pulling the fully hardened portion of said ribbon.

2. The process which comprises softening organic plastic molding compound by heating it, forcing said compound through a nozzle to form a flat ribbon, varying the transverse distribution of said compound while passing through said nozzle to control the cross-sectional shape thereof, chill-pressing the edges only of said ribbon, and drawing said ribbon transversely and supporting the hot plastic central portion of said ribbon out of contact with solids until it has hardened by gripping the chilled edges thereof, and by engaging and pulling the fully hardened portion of said ribbon.

3. Apparatus for shaping organic plastic material into a continuous ribbon by extrusion molding comprising a chamber for receiving said compound, means associated with said chamber for heating and softening said compound, a nozzle in communication with said chamber and having a slot for shaping into a ribbon the compound delivered thereto from said chamber, means associated with said nozzle for controlling the distribution of compound across said slot to control the cross-sectional shape of said ribbon, means for chilling the edge portions only of said ribbon immediately after it extrudes through said nozzle, means on opposite sides of said ribbon for gripping the chilled edge portions thereof to support the hot plastic portion of the ribbon, means for heating said ribbon as it moves away from said nozzle, and means engaging the full width of said ribbon for applying longitudinal tension thereto.

4. Apparatus for shaping organic plastic molding compound into a continuous ribbon by extrusion comprising a device for applying heat and pressure to said compound to soften it, an extrusion nozzle connected to said device and having a slot formed therein to form a flat ribbon, means associated with said nozzle for varying the transverse distribution of compound across said slot to control the cross-sectional shape of the ribbon during extrusion thereof, and means including initial chilling and gripping rolls for drawing said ribbon from said nozzle and for chilling the edges only of said ribbon, and additional means for gripping and drawing on the chilled edges and thereby supporting the remaining hot plastic portion of said ribbon out of contact with solids as it is drawn and until it has hardened.

5. Apparatus for shaping organic plastic molding compound into a continuous ribbon by extrusion comprising a device for applying heat and pressure to said compound, an extrusion nozzle having a slot therein to form said compound into a flat ribbon and having a passage through which said compound is forced by said device toward said slot, and an adjustable baffle in said passage adjacent the entrance end of said slot, said baffle being so shaped and arranged as to effect transverse distribution of compound fed to and through said slot, and means for supporting said baffle for rotary adjustment.

6. Apparatus for shaping organic plastic molding compound into a continuous ribbon comprising a device for subjecting said compound to heat and pressure, said device comprising an elongate chamber, a rotary feed screw for feeding the compound to said chamber, pressure responsive means for stopping and starting said screw to regulate the flow of plastic from said device, a screw in said chamber, means for heating said chamber, an extrusion nozzle connected to said chamber and having a slot therein for forming a flat ribbon, means in said nozzle for regulating the transverse distribution of the compound flowing into and through said slot, spaced rolls mounted close to the nozzle in position to receive the edge portions only of said ribbon as it is extruded and to chill said edge portions, flights of rolls for gripping the chilled edge portions of the ribbon to support said ribbon, each flight comprising opposed pair of rolls, and means for engaging the full width of a hardened portion of said ribbon to apply longitudinal tension to said ribbon.

7. In the shaping of solvent-free organic thermoplastic material in sheet form, the steps of applying heat to the principal portion of the sheet between narrow edge portions thereof to maintain it at a viscosity so low that said portion of the sheet is not self-supporting, and preventing the said portion of the sheet from slumping by keeping edge portions of the sheet chilled and stiffened, and gripping and conveying the chilled and stiffened edges in diverging paths to convey the sheet and stretch it transversely while subjecting the sheet to longitudinal pull.

8. The process of shaping solvent-free organic thermoplastic compound into sheet which comprises the steps of heating said compound and extruding and forming it into a sheet at a temperature so high and viscosity so low that the sheet is not self-supporting for a substantial distance away from the point of extrusion and would slump if not prevented from doing so, whereby introduction of strain and tendency of the finished sheet to unmold is prevented, and preventing the sheet from slumping by chilling edge portions only thereof as the sheet leaves the nozzle, gripping and conveying the chilled edge portions in diverging paths to convey the sheet and to stretch transversely the central hot plastic portion thereof, cooling the sheet until it has hardened across its entire width, and engaging and pulling on the hardened portion of said sheet.

9. The process of shaping solvent-free organic thermoplastic compound into sheet which comprises subjecting said compound to high temperature and pressure to soften it to working condition, forcing the heat-softened compound through a finely porous medium while heating it at high temperature to make the compound uniform in viscosity and capable of forming a smooth colloid structure, extruding the compound through a nozzle and forming it into sheet at a temperature so high and viscosity so low that the sheet is not self-supporting but would slump if not prevented from doing so, whereby introduction of strain and tendency to unmold is prevented, and preventing the sheet from slumping by chilling edge portions only thereof, gripping and conveying the chilled edge portions in diverging paths to stretch transversely the hot plastic central portion of the sheet, cooling the sheet until it has hardened across its entire width, and engaging and pulling on the hardened portion of said sheet.

10. The process of shaping organic, solvent-free thermoplastic compound into a continuous ribbon which comprises softening said compound by heating it, extruding said compound through a nozzle and forming it into a ribbon at high temperature, chill-pressing the edges only of said ribbon to permit the remaining hot and plastic central portion of the ribbon to be supported by such chilled edges, gripping and conveying the chilled edges of the ribbon in diverging paths to convey the ribbon and to stretch the ribbon transversely, applying heat to the hot and plastic central portion only of said ribbon during such transverse stretching thereof, cooling the ribbon across its entire width until it has hardened in its final shape and dimensions, and engaging and pulling on the fully hardened portion of said ribbon, the said ribbon thus being held out of contact with solids, excepting its edges, until hardened.

11. Apparatus for continuously forming solvent-free organic thermoplastic material into sheet comprising a screw type extruder, means for heating the extruder to soften the material therein, a nozzle through which said material is forced by said extruder to form a flat ribbon, rolls closely associated with the nozzle for chill-pressing the edges only of said ribbon to permit the sheet to be held at its edge without tearing or distortion, means for gripping and conveying the chilled edges of said ribbon in diverging paths to convey the ribbon and stretch it transversely, and a puller located in a position to engage and pull the ribbon where it has hardened to its final shape and dimensions, the principal portion of said sheet being thereby held out of contact with solid surfaces between the nozzle and said puller.

JAMES BAILEY.